United States Patent [19]

Lungershausen et al.

[11] Patent Number: 5,701,015
[45] Date of Patent: Dec. 23, 1997

[54] INFRARED ILLUMINATION SYSTEM FOR DIGITAL CAMERA

[75] Inventors: Arnold Lungershausen, West Henrietta; Carl Lawrence Holden, Rochester, both of N.Y.

[73] Assignee: Eastman Kodak Company, Rochester, N.Y.

[21] Appl. No.: 699,315

[22] Filed: Aug. 19, 1996

[51] Int. Cl.⁶ ............................................. H05B 41/29
[52] U.S. Cl. ...................... 250/495.1; 250/494.1; 250/504 R; 250/504 H; 396/109
[58] Field of Search .................. 250/495.1, 494.1, 250/493.1, 504 R, 504 H, 333; 396/109, 111, 155

[56] References Cited

U.S. PATENT DOCUMENTS

| | | | |
|---|---|---|---|
| 4,866,285 | 9/1989 | Simms | 250/495.1 |
| 4,958,180 | 9/1990 | Matsui et al. | 250/495.1 |
| 4,969,004 | 11/1990 | Matsui et al. | 250/495.1 |

*Primary Examiner*—Kiet T. Nguyen
*Attorney, Agent, or Firm*—Thomas H. Close

[57] ABSTRACT

An infrared illumination system for a digital camera having a taking lens, includes: a plurality of infrared emitting diodes arranged around the taking lens, each diode being contained in a can having an infrared transparent window; a first diffuser located over the windows of the cans; and a second diffuser spaced apart from the first diffusers. The first diffuser is a new type of diffuser called a Fourier transform holographic diffuser.

9 Claims, 2 Drawing Sheets

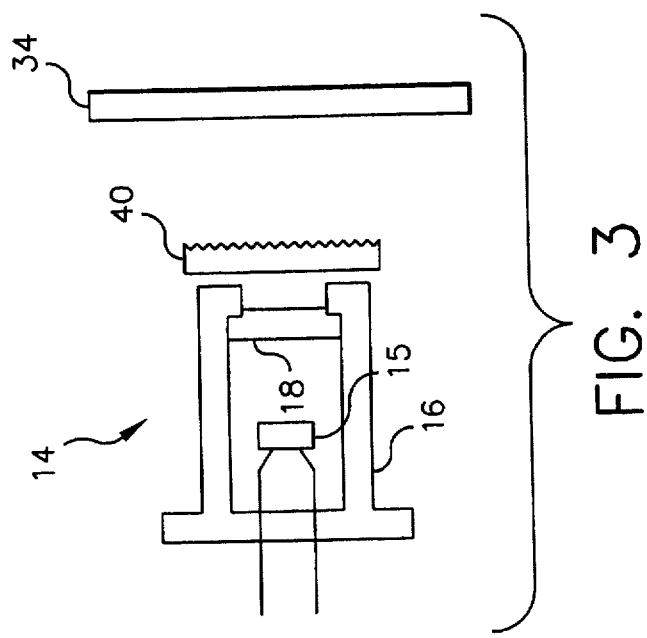
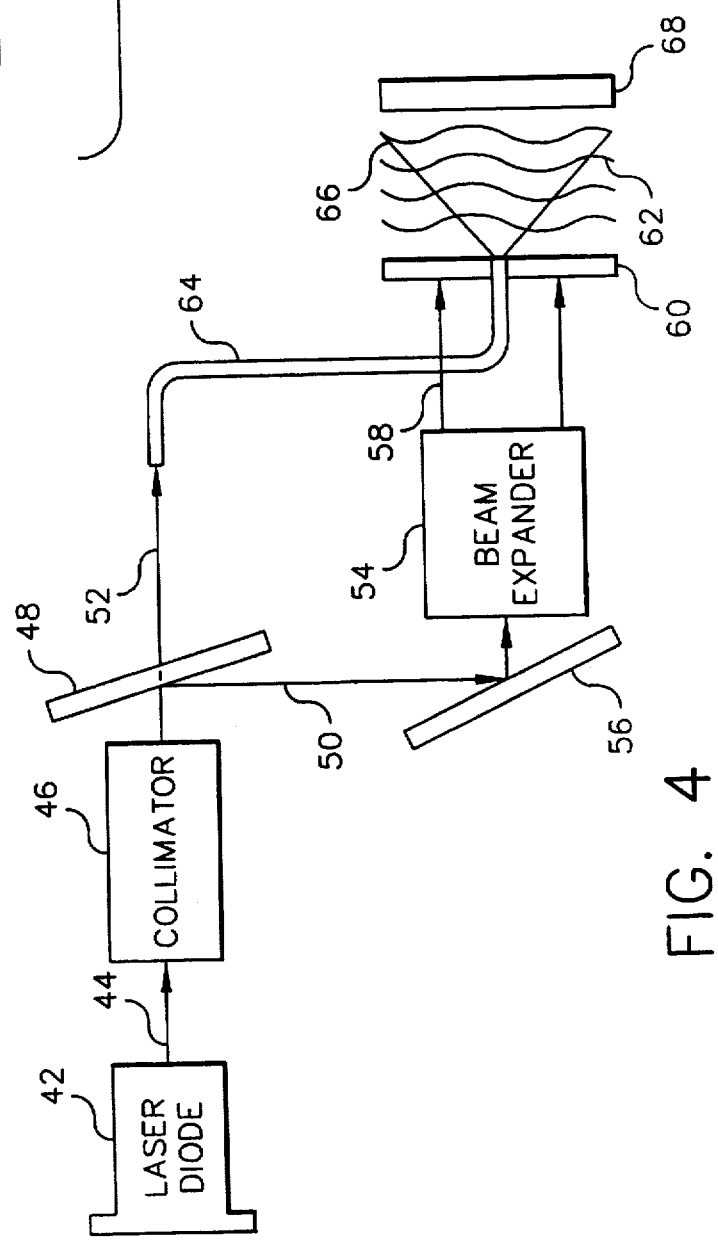

INFRARED ILLUMINATION SYSTEM FOR DIGITAL CAMERA

FIELD OF THE INVENTION

The invention relates generally to the field of digital photography, and in particular to infrared illumination systems for digital infrared cameras

BACKGROUND OF THE INVENTION

It is known to employ digital cameras to capture infrared information from a scene. In prior art digital infrared image capture systems, the illumination source has been ambient infrared light either reflected from or emitted by the subject. In applications such as surveillance or machine vision, an additional source of illumination is desirable. In applications such as surveillance, it would be preferable if the source of such illumination remained unnoticed by the subject. Conventional flash systems capable of producing substantial infrared light also produce appreciable quantifies of visible light. If the visible light from such a flash is filtered out to produce an infrared flash, the resulting flash apparatus is inefficient, since a considerable portion of the energy produced by the flash is wasted. In applications such as machine vision, it is preferable that the source of illumination be highly uniform.

U.S. Pat. No. 4,866,285 issued Sep. 12, 1989 to Simms discloses a light source for an infrared film camera having one or more infrared diode light sources. It has been found that due to the point source nature of the infrared diodes, the illumination from such a light source is non-uniform at the subject. There is therefore a need for an energy efficient uniform source of infrared illumination for infrared electronic photography.

SUMMARY OF THE INVENTION

The present invention is directed to overcoming one or more of the problems set forth above. Briefly summarized, according to one aspect of the present invention, an infrared illumination system for a digital electronic camera having a taking lens, includes: a plurality of infrared emitting diodes arranged around the taking lens, each diode being contained in a package having an infrared transparent window; a set of two diffusers is located over the windows of the packages; and a single diffuser spaced apart from the first diffusers. We have discovered that a single diffuser placed over the windows of the packages of the infrared light emitting diodes is not effective to sufficiently diffuse the light from the diodes to eliminate "hot spots" in the illumination from the diodes. The addition of the second diffuser over the window as well as the second "spaced" diffuser significantly improved the uniformity of illumination. According to a further aspect of the present invention, the first diffuser is a new type of diffuser called a Fourier transform holographic diffuser.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of providing a more uniform, energy efficient illumination of the photographic subject.

BRIEF DESCRIPTION OF THE DRAWINGS

FIG. 3 is a schematic diagram illustrating one of the infrared light emitting diodes and an alternative embodiment of the first diffuser as a Fourier transform holographic diffuser; and FIG. 4 is a schematic diagram illustrating one way of making the Fourier transform holographic diffuser of FIG. 3.

DETAILED DESCRIPTION OF THE INVENTION

Figure 1:
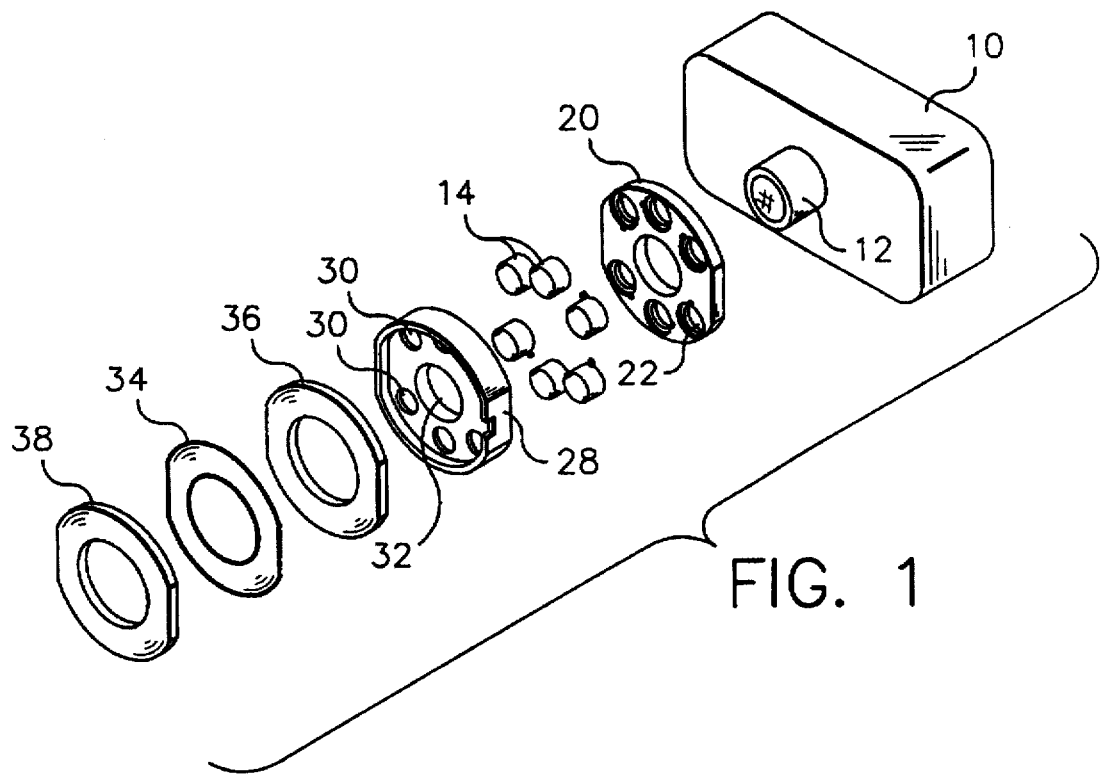
FIG. 1 is a exploded perspective view of an infrared illumination system according to the present invention.
Figure 2:
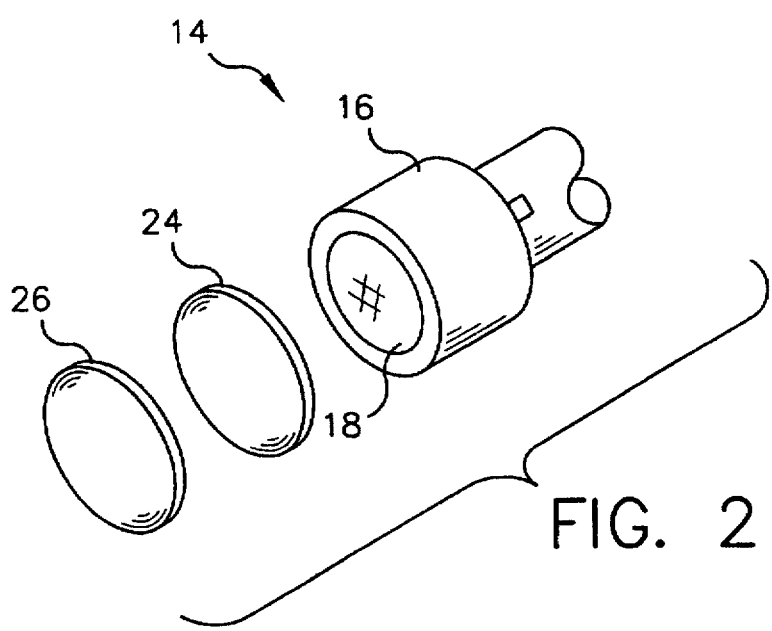
FIG. 2 is an exploded perspective view of one of the infrared light emitting diodes and associated diffusers shown in FIG. 1.

Referring to FIG. 1, a digital infrared camera 10 of the type known in the prior art, such as custom miniaturized Infrared Cameras, sold by the Eastman Kodak Company, Rochester, N.Y., has a taking lens 12. An infrared illumination system according to the present invention surrounds the taking lens 12 and includes a plurality of infrared light emitting diodes 14, such as HE8812 infrared light emitting diodes from the Hitachi Corporation, Japan. As shown in FIG. 2, the light emitting diodes 14 are packaged in cans 16 having flat infrared transmissive windows 18. The infrared light emitting diodes 14 are arranged symmetrically around taking lens 12 in a collar 20 having nests 22 for receiving the diodes 14.

A plurality of diffusers made up of pairs of diffusing disks 24 and 26 are located over the windows 18 of the infrared light emitting diodes 14. A locating ring 28 defines a plurality of apertures 30 for holding the infrared light emitting diodes 14 and the diffusing disks (24, 26) into position around taking lens 12. The ring 28 also defines a central aperture 32 for receiving the taking lens 12. The locating ring 28 includes a recess for receiving a ring shaped second diffuser 34. The second diffuser 34 is sandwiched between first and second rings of infrared transmissive glass 36 and 38 respectively. The first ring of infrared transmissive glass 36 spaces first diffusing discs 24, 26 by a predetermined amount from the second diffuser 34. The second ring of infrared transmissive glass 38 provides a protective cover for the second diffuser 34.

Preferably, the first diffuser is made from two disks 24, 26 of 0.3mm thick SPECTRALON™ diffusing material available from Labsphere Corporation, North Sutton, N.H. The second diffuser 34 is made from one sheet of 0.5mm thick SPECTRALON™, and the two diffusers are spaced apart by 4.75mm. Alternatively, rather than separate discs, the first dffuser can be made of a ring of diffuser material similar to the second diffuser.

Referring to FIG. 3, the light emitting diode 14, having a light emitting surface 15 inside can 16 is shown with an alternative embodiment of a first diffuser. In this embodiment, the first diffuser is a Fourier transform holographic diffuser 40. The Fourier transform holographic diffuser 40 contains a holographic pattern that is effective to diffuse a substantially monochrome beam of light from a point source located at a given distance from the diffuser. The diffuser 40 acts as if it were a conventional diffuser located precisely at the point source, in this case, the light emitting surface 15. This diffuser 40 has the advantages of being more transmissive than conventional diffusers and is less sensitive to errors in locating the diffuser with respect to the light source.

Referring to FIG. 4, a method for constructing the holographic diffuser 40 of FIG. 3 will be described. A source of coherent light, such as a laser diode 42, produces a beam of light 44 that is collimated by a collimator 46. The laser diode 42 may be selected to emit substantially the same wavelength of light as the light emitting diodes 14, but this is not a strict requirement. The collimated beam is split by a variable beam splitter 48 into an object beam 50 and a reference beam 52. The variable beam splitter 48 may be adjusted to vary the amount of light into the object and reference beams to optimize the formation of the interference pattern described below. The object beam 50 is directed to a beam expander 54 by a mirror 56. The expanded beam 58 illuminates a conventional diffuser 60, such as a sheet of SPECTRALON™ diffusing material, or frosted glass to form a diffuse object wavefront 62.

The reference beam 52 is coupled into an optical fiber 64. The optical fiber 64 is routed through a pinhole in the conventional diffuser 60 at a location corresponding to the eventual position of the light emitting surface of the infrared light emitting diode, to emit a reference wavefront 66 at that location. The interference pattern formed by the diffuse object wavefront 62 and the reference wavefront 66 is recorded by a photosensitive plate 68 located at a recording plane representing the eventual location (i.e. over the window 18 of the can 16) of the holographic diffuser relative to the light emitting surface of the infrared light emitting diode.

The exposed photosensitive plate 68 is developed to produce the Fourier transform holographic diffuser 40. The resulting Fourier transform holographic diffuser has the effect of a conventional diffuser located at the light emitting surface 15 of the light emitting diode 14. The Fourier transform holographic diffuser produced by this method is useful in any optical application where it is desirable to diffuse substantially monochromatic light from a substantially point source.

The electronics employed to power the light emitting diodes 14 in the present invention are conventional and not shown. The electronics apply a current pulse of variable width, depending on the amount of illumination desired, simultaneously to all of the light emitting diodes when the camera is actuated.

The invention has been described with reference to a preferred embodiment. However, it will be appreciated that variations and modifications can be effected by a person of ordinary skill in the art without departing from the scope of the invention.

| PARTS LIST |
| --- |
| 10 digital infrared camera |
| 12 taking lens |
| 14 infrared light emitting diodes |
| 15 light emitting surface |
| 16 can |
| 18 infrared transmissive window |
| 20 collar |
| 22 nests |
| 24 diffusing disk |
| 26 diffusing disk |
| 28 locating ring |
| 30 aperture |
| 32 central aperture |
| 34 second diffuser |
| 36 infrared transmissive glass ring |
| 38 infrared transmissive glass ring |
| 40 Fourier transform holographic diffuser |

| -continued |
| --- |
| PARTS LIST |
| 42 laser diode |
| 44 beam of light |
| 46 collimator |
| 48 variable beam splitter |
| 50 object beam |
| 52 reference beam |
| 54 beam expander |
| 56 mirror |
| 58 expanded beam |
| 60 conventional diffuser |
| 62 object wavefront |
| 64 optical fiber |
| 66 reference wavefront |
| 68 photosensitive plate |

We claim:

1. An infrared illumination system for a digital camera having a taking lens, comprising:

a) a plurality of infrared emitting diodes arranged around the taking lens, each diode being contained in a package having an infrared transparent window;

b) first diffuser means located over the windows of the packages for diffusing the light from the infrared light emitting diodes; and c) second diffuser means spaced apart from the first diffuser means for further diffusing the light from the light emitting diodes.

2. The infrared illumination system claimed in claim 1, wherein the first diffuser means has stronger diffusing properties than the second diffuser means.

3. The infrared illumination system claimed in claim 1, wherein the infrared light emitting diodes are arranged symmetrically around the taking lens.

4. The infrared illumination system claimed in claim 1, wherein the packages containing the infrared light emitting diodes are cans.

5. The infrared illumination system claimed in claim 1, wherein the first diffuser means comprise two sheets each sheet having a thickness of 0.3mm and making of SPECTRALON™ diffusing material and the second diffuser means comprises one sheet having a thickness of 0.5mm and making of SPECTRALON™ diffusing material, and wherein the first and second diffuser means are spaced apart by 4.75 mm.

6. The infrared illumination system claimed in claim 1, further comprising a layer of infrared transmissive glass over the second diffuser means.

7. The infrared illumination system claimed in claim 1, wherein the second diffuser means is a ring shaped diffuser surrounding the taking lens.

8. The infrared illumination system claimed in claim 1, wherein the first diffuser means is a Fourier transform holographic diffuser.

9. The infrared illumination system claimed in claim 8, wherein the Fourier transform holographic diffuser is located at a light emitting surface of the infrared light emitting diode.

\* \* \* \* \*